United States Patent
Dharmadhikari (10) Patent No.: US 12,078,144 B2
(45) Date of Patent: Sep. 3, 2024

(54) ROTOR BLADE FOR A WIND TURBINE

(71) Applicant: General Electric Renovables Espana, S.L., Barcelona (ES)

(72) Inventor: Parag Rameshchandra Dharmadhikari, Garching b. München (DE)

(73) Assignee: General Electric Renovables Espana, S.L., Barcelona (ES)

(*) Notice: Subject to any disclaimer, the term of this patent is extended or adjusted under 35 U.S.C. 154(b) by 0 days.

(21) Appl. No.: 18/043,120

(22) PCT Filed: Aug. 27, 2021

(86) PCT No.: PCT/EP2021/073786
§ 371 (c)(1),
(2) Date: Feb. 27, 2023

(87) PCT Pub. No.: WO2022/043520
PCT Pub. Date: Mar. 3, 2022

(65) Prior Publication Data
US 2023/0313777 A1    Oct. 5, 2023

(30) Foreign Application Priority Data
Aug. 28, 2020  (EP) .................................... 20193439

(51) Int. Cl.
*F03D 1/06*    (2006.01)
*F03D 80/30*   (2016.01)
*F03D 80/40*   (2016.01)

(52) U.S. Cl.
CPC ........... *F03D 1/0675* (2013.01); *F03D 80/30* (2016.05); *F03D 80/40* (2016.05); *F05B 2240/85* (2020.08)

(58) Field of Classification Search
CPC ......... F03D 1/0675; F03D 80/30; F03D 80/40
See application file for complete search history.

(56) References Cited

U.S. PATENT DOCUMENTS 6,612,810 B1   9/2003  Olsen et al.
9,797,381 B2   10/2017 Iriarte Eleta et al.
(Continued)

FOREIGN PATENT DOCUMENTS

CN    106351890 A    1/2017
EP      2675030 A1   12/2013
(Continued)

OTHER PUBLICATIONS

European Search Report Corresponding to EP20193439 on Jan. 28, 2021.
(Continued)

*Primary Examiner* — Courtney D Heinle
*Assistant Examiner* — John S Hunter, Jr.
(74) *Attorney, Agent, or Firm* — Dority & Manning, P.A.

(57) ABSTRACT

A rotor blade for a wind turbine includes a blade skin forming a suction surface and a pressure surface. An electric heating arrangement has a heating strip with a width-thickness relation configured to reduce bonding between ice and the blade skin by electrically heating a respective surface of the blade skin and to conduct lightning-strike currents of at least 10 kA. An energy transfer arrangement supplies electrical energy to the heating arrangement. An integrated lightning arrangement includes a lightning receptor mounted to a tip section of the blade and electrically connected to the heating strip such that the lightning strike is conducted from the lightning receptor to the heating strip. A grounding device is connected to a grounding arrangement of the wind turbine such that electrical energy of the lightning strike is conducted from the heating strip through the grounding device and into the grounding arrangement.

15 Claims, 3 Drawing Sheets

(56) References Cited

U.S. PATENT DOCUMENTS

| | | | |
|---|---|---|---|
| 10,294,925 B2 | 5/2019 | Klein | |
| 10,648,456 B2 * | 5/2020 | Shain | F03D 80/30 |
| 2018/0112649 A1 * | 4/2018 | Shain | F03D 80/40 |
| 2022/0349389 A1 * | 11/2022 | Spandley | F03D 80/40 |

FOREIGN PATENT DOCUMENTS

| | | | |
|---|---|---|---|
| EP | 2857678 A1 | 4/2015 | |
| RU | 2591369 C2 * | 7/2016 | B23P 15/04 |
| WO | WO0079128 A1 | 12/2000 | |

OTHER PUBLICATIONS

PCT International Search Report & Written Opinion Corresponding to PCT/EP2021/073786 on Nov. 22, 2021.
McNiff, Wind Turbine Lightning Protection Project 1999-2001, NREL/SR-500-31115, National Renewable Energy Laboratory, XP002419155, May 2002, 100 pages.

* cited by examiner

ROTOR BLADE FOR A WIND TURBINE

RELATED APPLICATIONS

The present application claims priority to PCT Application Serial Number PCT/EP2021/073786, filed on Aug. 27, 2021, which claims priority to EP Application No. 20193439.5, filed on Aug. 28, 2020. Both applications are incorporated by reference herein.

FIELD

The present subject matter relates generally to rotor blades for wind turbines. More specifically, the subject matter refers to provide counter-measures against generation of ice on surfaces of rotor blades, in particular of rotor blades which are operated in sub-zero regions.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The development of layer of ice on a surface of a rotor blade negatively influences the performance of the respective wind turbine such, that an overall energy production is reduced. Furthermore, ice being present on a rotating rotor blade may as well cause additional loads and/or rotational imbalance, which subsequently may require a reduction of power generation and/or may result in a reduction of the lifetime of the wind turbine.

In the past, several possible solutions were implemented in order to prevent generation of ice on surfaces of rotor blades. For example, wind turbines were equipped with hot air blowing arrangements which produce a hot stream of air being directed into an interior volume of rotor blades. This led to an overall heating of the respective rotor blade causing ice present on an exterior surface of the rotor blade to melt and subsequently to fall off the rotor blade.

As an alternative, heating arrangements including carbon heating mats were applied to a skin of a rotor blade.

All present solutions seem not to be able to satisfy the needs of the market and/or of requirements of an operation of a wind turbine in sub-zero regions.

Accordingly, the present disclosure is directed to a rotor blade for a wind turbine having improved operational characteristics, in particular with regard to preventing negative impact of ice on rotor blades on the operation of wind turbines. In addition, the present disclosure is directed to a rotor having improved rotor blades and two a wind turbine having a hereby improved rotor.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine, in particular to a rotor blade for a rotor a wind turbine.

The rotor comprises a root section having a blade root, a tip section having a blade tip, a middle section connecting the root section with the tip section, and a blade skin forming a suction surface and a pressure surface of the rotor blade.

Furthermore, the rotor blade comprises an electric heating arrangement having at least one or a plurality of heating strips. The heating arrangement may have several portions, wherein the heating strip and/or portions of the heating arrangement or the entire heating arrangement is/are located and/or mounted in/to the rotor blade.

Additionally, the rotor blade comprises at least a blade portion of an energy transfer arrangement being electrically connected to the heating arrangement for supplying electrical energy to the heating arrangement.

In the meantime, the rotor blade comprises an integrated lightning arrangement having at least one lightning receptor mounted to the tip section and being electrically connected to the heating strip, wherein such connection is configured to be capable of conducting electrical energy of a lightning strike from the lightning receptor into the heating strip. Furthermore, the lightning arrangement comprises a grounding device which is mounted to and/or in the root section of the rotor blade and which is configured for conducting electrical energy received from the lightning receptor via the heating strip into a grounding arrangement of the wind turbine. The electrical connection between the heating strip and the grounding arrangement of the wind turbine is configured such, that electrical energy of a lightning strike can be conducted safely off the rotor blade into the grounding arrangement. For example, the grounding device may be electrically connected to the grounding arrangement via a spark gap arrangement.

According to an embodiment, the heating strip has a width-thickness relation of at least 50:1, in particular of at least 200:1, preferably of at least 500:1, and/or of not more than 2000:1, in particular not more than 1000:1, preferably not more than 750:1.

Additionally, the heating strip is flexible such that the heating strip may perform deformations according deformations of the overall rotor blade or the skin of the rotor blade during operation of the wind turbine, for example due to bending of the rotor blade in a flap wise direction.

In particular, the heating strip is arranged with the blade skin and extends over 50%, in particular over 65%, preferably over 80%, of a total length of the rotor blade in a longitudinal direction of the rotor blade.

Aforementioned configuration and additional details of the design of the heating strip are chosen such that the heating strip is configured for being capable to reduce an adhesive bonding between ice and the blade skin by electrically heating a respective surface of the blade skin and to conduct lightning caused currents of at least 10 kA without causing damage to the rotor blade. The term "without causing damage to the rotor blade" shall reflect that a strike of a lightning bolt into a tip section of the rotor blade does not lead to a reduction of the overall scheduled lifetime of the wind turbine or of the rotor blade. That means, in cases wherein rotor blades are designed for receiving, conducting, withstanding, thus, tolerating a specific number of strikes of lightning bolts, even if those lightning bolts and/or the respective conduction of electrical energy have certain but acceptable physical consequences on components and/or the structure of the rotor blade the term "without causing damage to the rotor blade" is applicable.

The heating strip may be embodied as a heat layer and may comprise a plurality of sub-strips forming the overall heating strip. The heating strip or a respective sub-strip may be arranged on an inner surface of the skin of the rotor blade, on an outer surface and/or may be laminated within the skin.

According to an embodiment, the heating strip and/or the sub-strip may have a rectangular cross-section and/or a tailored thickness in order to comply with the requirements. For example, the heating stripe may have the requirement—in order to be configured for being to conduct electrical energy of a lightning strike from the lightning receptor to grounding device—to have a tailored thickness and/or cross-section, for example having a thinner portion in a leading edge direction of the rotor blade and having a thicker portion in direction of the trailing edge of the rotor blade, or vice versa.

For example, a tailored thickness may be embodied according to a so-called "Precisely Controlled Oriented Thickness", in particular for the purpose of providing heating requirements in proportion and/or at various co-ordinates on the blade surface.

In particular, a cross-section of the heating strip and/or the sub-strip is not constant in longitudinal direction of the rotor blade, for example, a width and/or thickness of the heating strip and/or the sub-strip at a longitudinal position may be determined depending on a size of the respective chord length at said longitudinal position.

Additionally and/or alternatively, a width and/or thickness of the heating strip and/or the sub-strip at a longitudinal position may be proportional and/or depending to a size of the respective chord length at said longitudinal position. Thus, a width and/or thickness of the heating strip and/or the sub-strip located in a longitudinal range of the rotor blade having an increasing chord size in longitudinal direction would as well increase in longitudinal direction and/or a width and/or thickness of the heating strip and/or the sub-strip located in a longitudinal range of the rotor blade having a decreasing chord size in longitudinal direction would as well decrease in longitudinal direction. In this context, a longitudinal direction may be determined as being extending from the blade root toward the blade tip.

The present subject matter provides for the first time a rotor blade having a simplified design and therefore being highly cost-effective with respect to manufacturing and with respect to operational costs of a wind turbine having such rotor blades. In particular, the heating arrangement and the lightning arrangement according to the described embodiment and/or according to embodiments as described infra enable the integrated functionality of deicing the rotor blade by heating up the respective surface carrying ice, and in the meantime providing a reliable and capable electrical connection for guiding electrical energy of lightning bolts striking the tip of the rotor blade securely to a grounding arrangement of the wind turbine.

According to an embodiment aspect, the lightning arrangement and the heating arrangement form one single electrical circuit and/or are electrically connected to each other such, that no additional shielding between the heating arrangement, specifically between the blade portion of the energy transfer arrangement, and the lightning arrangement, specifically and the grounding device is necessary. Hence, the current aspect of the subject matter provides an integration of three functions: heating function, shielding function and grounding (earthing) function.

According to an embodiment, the heating strip or a plurality of heating strips extends at least over 80%, in particular at least over 90%, preferred at least over 95% of an overall length of the wind turbine.

According to an embodiment, the heating arrangement comprises at least one heating loop having two heating strips which are connected to each other in the tip section, and wherein each heating strip has an end portion arranged in the root section, wherein at least one end portion, preferably both end portions, is/are electrically connected to the blade portion of the energy transfer arrangement. For example, the blade portion of the energy transfer arrangement and the heating loop form an electric circuit, in particular, wherein this electric circuit is shielded from other electrical components of the rotor blade, of the hub of the rotor, and/or of the wind turbine. Such shielding can be achieved, for example, by providing a contactless electrical connection between the blade portion of the energy transfer arrangement and an additional portion of the energy transfer arrangement, for example a hub portion of the energy transfer arrangement located in a hub of the rotor of the wind turbine. Additionally or in the alternative, such shielding can be achieved for example by configuring an electrical connection of the lightning arrangement, specifically of the lightning device and the grounding arrangement of the wind turbine in a contactless manner, for example by using the spark gap arrangement.

According to a further embodiment, the heating arrangement comprises at least a first heating loop and a second heating loop, in particular, wherein at least two root portions two heating strips are electrically connected to each other such, that the first heating loop and the second heating loop form a serial electrical conductor at least partially made from four heating strips. For example, the heating arrangement may have four heating strips—strip 1, strip 2, strip 3, and strip 4—, each strip possibly being formed by a plurality of sub-strips: in a serial configuration, a root portion of strip 1 is connected to the blade portion of the energy transfer arrangement. A tip portion of strip 1 is electrically connected to a tip portion of strip 2, a root portion of strip 2 is electrically connected to a root portion of strip 3, a tip portion of strip 3 is electrically connected to a tip portion of strip 4, wherein—for forming and closing the electric circuit strip—a root portion of strip 4 is electrically connected to the blade portion of the energy transfer arrangement. Aforementioned electrical principle for forming a serial connection exemplary describes an embodiment having two heating loops and four heating strips: however, said teaching may also refer to other serial loop embodiments having for example three/four/five loops and respectively six/eight/ten heating strips.

Optionally, aforementioned embodiment can be configured such, that the two heating loops are connected to each other in a parallel way. Exemplary, in order to describe the general principle, but not limited to, the root portions of strip 2 and strip 3 would also be connected to the blade portion of the energy transfer arrangement. This general configuration, to arrange at least two heating loops parallel with regard to each other, could also be applied to a plurality of heating loops. Furthermore, it is possible to arrange at least two heating loops in a serial connection together with at least one additional heating loop in a parallel connection.

According to an embodiment, at least two heating loops are provided, wherein the grounding device is connected with a portion of the heating arrangement connecting a plurality of root portions, in particular two root portions, of heating strips to each other. Preferably, at least one lightning receptor is physically and electrically connected to at least both heating loops, respectively to at least one tip portion of a heating strip of each, in particular both, heating loops.

According to an embodiment, the heating arrangement comprises an even number of heating strips, in particular two, four, six or eight heating strips forming one, two, three, or four heating loops.

According to an embodiment, at least one heating strip, in particular all heating strips, is/are insulated with respect to the blade skin. For example, this can be achieved by laminating the heating strip between additional layers of a fibre reinforced material of the blade skin using a non-conductive, thus an insulating resin.

According to an embodiment, the heating arrangement and/or the heating strip and/or all heating strips has/have an overall resistance high enough for sufficiently mitigate ice on a surface of the rotor blade by obtaining a desired energy dissipation into heat, as well as minimal enough to sustain the lightning currents. Alternatively or additionally, the heating arrangement has an overall resistance of at least 0.1 ohm, and/or of not more than 1 ohm.

According to an embodiment, the heating arrangement is configured for introducing sufficient heat energy into the blade skin for melting an adhesion of ice and a blade surface, for example by inducing more than 10 KW into the respective blade surface, and/or of not more than 400 KW, in particular not more than 200 KW. For example, the upper limit may depend on a power control system used, for example continuous heating, On-Off Control, Phase Control, Voltage Contro, Pulse Width Modulation, Integral Cycle control or any combination thereof.

According to an embodiment, the heating arrangement is configured for introducing sufficient heat energy into the blade skin, for example more than 0.1 kW per square meter surface of the blade skin, in particular more than 0.5 kW/m$^2$, preferred more than 1 kW/m$^2$, and/or not more than 20 kW/m$^2$, in particular not more than 10 kW/m$^2$, preferred not more than 3 kW/m$^2$. Said values may depend on the effective area, leading edge, trailing edge, tip section, middle section and/or root section to be covered.

According to an embodiment, the heating strip and/or a sub-strip of the heating strip, in particular all heating strips is/are embodied as a continuous solid material. The term "continuous material" refers to a material which has essentially no discontinuities or physical intersections, like wholes or cutouts. However, said term may not exclude, that at least a few physical intersections—for example for mounting purposes or electrical connection purposes—are still provided in the continuous material. By embodying the heating strip as a continuous material, the capability of the heating strip for conducting electrical energy of a lightning strike is achieved.

According to a further embodiment, the heating strip is configured such that it can be provided as a tape material, for example in rolled-up form. For example, the raw material of the heating strip is a rolled up copper tape, which is easy to carry and/or to handle during manufacturing.

According to a preferred embodiment, in particular not limited to one of the preceding embodiments, but according to the current general aspect of the subject matter, the heating strip is essentially made from copper, preferably having a purity of more than 80%, in particular more than 90%, more preferred of more than 95%. Additionally or in the alternative, the heating strip is made from a suitable copper alloy.

According to an embodiment—but not limited to—, the energy transfer arrangement comprises a transformer device or multiple transformer devices having a blade transformer portion being firmly mounted to the root section of the rotor blade, and a hub transformer portion. The transformer device is configured for contactless transmitting electrical energy from the hub transformer portion to the blade transformer portion.

In particular and/or preferably, the hub transformer portion is firmly mounted to a rotor hub of a rotor of the wind turbine.

According to an embodiment, the transformer device is configured as being at least partially a toroidal transformer. For example, the hub transformer portion of the transformer device may be a toroidal transformer portion or may comprise a toroidal transformer portion/s. In particular, at least a portion of the heating arrangement may protrude a radial opening of the toroidal transformer portion and/or may embrace an outer ring of the toroidal transformer portion such that electrical energy can be induced into the heating arrangement by the toroidal transformer portion.

For example, the heating arrangement and the transformer device is embodied such, that at least one heating strip having an appropriate geometric configuration protrudes and/or embrace the at least one toroidal transformer portion, wherein the protrusion and/or embracing is determined such, that sufficient energy may be introduced in the heating arrangement by the toroidal transformer portion. According to a specific embodiment, but not limited, the hub portion of the energy transfer arrangement may comprise a plurality of toroidal transformer portions.

According to an embodiment, the blade transformer portion of the transformer device may be at least partially formed by a root portion of a heating strip or by a plurality of root portions thereof.

If the energy transfer arrangement comprises a toroidal transformer (hub portion of the energy transfer arrangement) the blade transformer portion would be embodied by at least partially by a plurality of root portions of a plurality of heating strips protruding and/or embracing the toroidal transformer.

In particular, if the heating arrangement comprises a plurality of heating loops, in particular two heating loops, and wherein at least two heating loops are arranged electrically parallel with respect to each other, at least one root portion of each parallel arranged heating loop may protrude the toroidal transformer, wherein at least another root portion of each parallel heating loop may embrace the toroidal transformer.

According to an embodiment, the heating strip is a continuous solid material not being formed by an elevated number of parallel aligned single conductors, and/or wherein the heating strip is a continuous solid material not being formed by more than 50, in particular not more than 30, preferred not more than 15, more preferably not more than ten of parallel and/or series combination of arranged single conductors.

According to an additional aspect, a rotor for a wind turbine is disclosed, wherein the rotor comprises a rotatable hub and at least one rotor blade according to one or a plurality of the precedingly described embodiments. The rotor blade is rotatably mounted to the hub, wherein the hub comprises a pitch assembly for rotating the rotor blade about a pitch axis of the rotor blade.

According to an embodiment, the hub transformer portion is firmly mounted to the hub such and configured such that electrical energy can be transferred from the hub transformer portion to the blade transformer portion.

In another aspect, the present disclosure is directed to a wind turbine comprising a rotor according to one of the preceding embodiments of a rotor for a wind turbine.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers

DETAILED DESCRIPTION OF THE INVENTION

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

Figure 1:
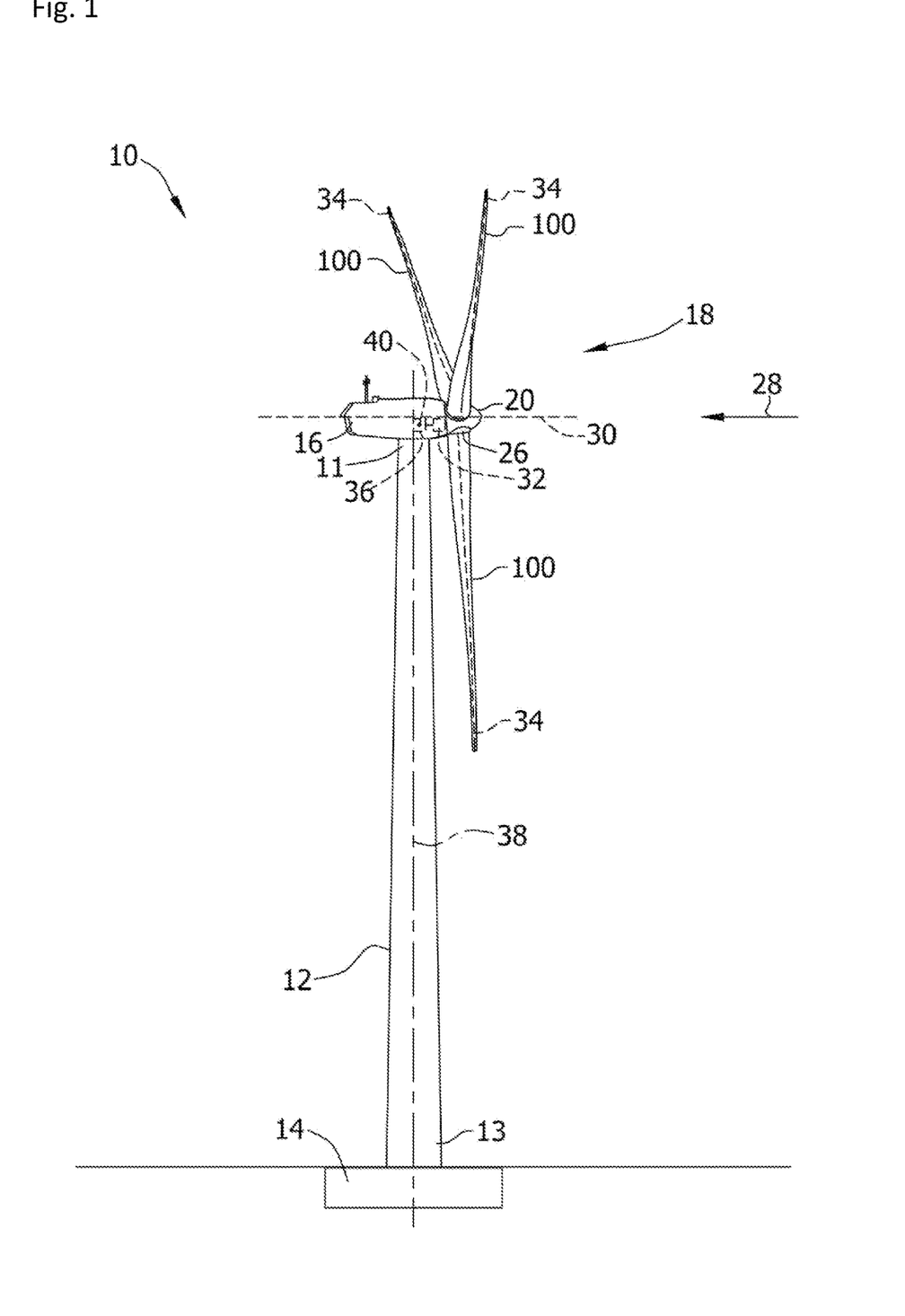
FIG. 1 illustrates a perspective view of one embodiment of a wind turbine according to the present disclosure.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 100 coupled to and extending outward from the hub 20. In the exemplary embodiment, the rotor 18 has three rotor blades 100. In an alternative embodiment, the rotor 18 includes more or less than three rotor blades 100. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 100 are spaced about the hub 20 to facilitate rotating the rotor 18 to enable kinetic energy to be transferred from the wind into usable mechanical energy, and subsequently, electrical energy. The rotor blades 100 are mated to the hub 20 by coupling a root section 110 to the hub 20 at a plurality of load transfer regions 26. The load transfer regions 26 may have a hub load transfer region and a blade load transfer region (both not shown in FIG. 1). Loads induced to the rotor blades 100 are transferred to the hub 20 via the load transfer regions 26.

In one embodiment, the rotor blades 100 have a length ranging from about 15 meters (m) to about 91 m. Alternatively, rotor blades 100 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 18 is rotated about an axis of rotation 30. As the rotor blades 100 are rotated and subjected to centrifugal forces, the rotor blades 100 are also subjected to various forces and moments. As such, the rotor blades 100 may deflect and/or rotate from a neutral, or non-deflected, position to a deflected position.

Moreover, a pitch angle of the rotor blades 100, i.e., an angle that determines a perspective of the rotor blades 100 with respect to the wind direction, may be changed by a pitch system 32 to control the load and power generated by the wind turbine 10 by adjusting an angular position of at least one rotor blade 100 relative to wind vectors. Pitch axes 34 of rotor blades 100 are shown. During operation of the wind turbine 10, the pitch system 32 may change a pitch angle of the rotor blades 100 such that the rotor blades 100 are moved to a feathered position, such that the perspective of at least one rotor blade 100 relative to wind vectors provides a minimal surface area of the rotor blade 100 to be oriented towards the wind vectors, which facilitates reducing a rotational speed and/or facilitates a stall of the rotor 18.

In the exemplary embodiment, a blade pitch of each rotor blade 100 is controlled individually by a wind turbine controller 36 or by a pitch control system 80. Alternatively, the blade pitch for all rotor blades 100 may be controlled simultaneously by said control systems.

Further, in the exemplary embodiment, as the wind direction 28 changes, a yaw direction of the nacelle 16 may be rotated about a yaw axis 38 to position the rotor blades 100 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
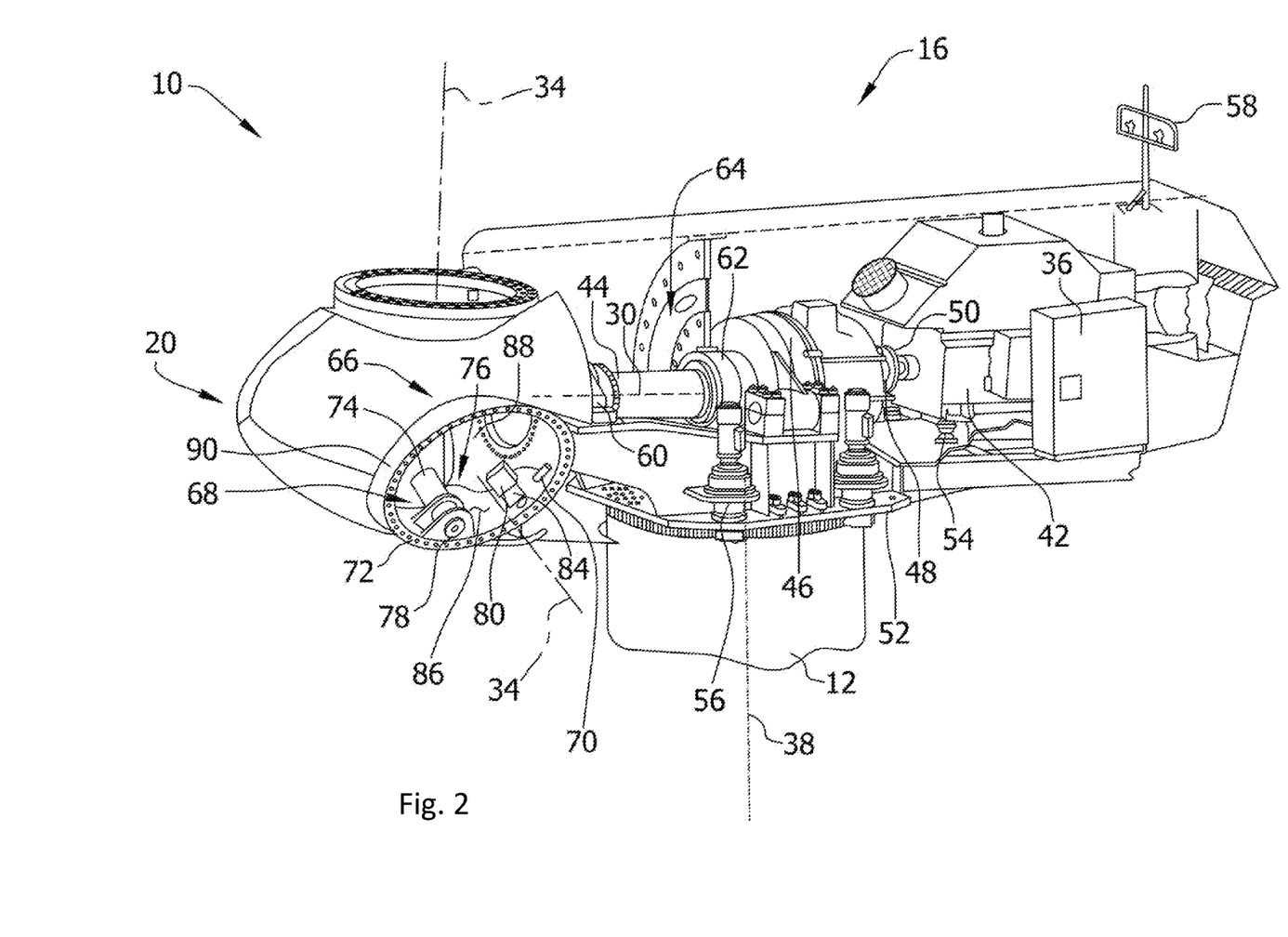
FIG. 2 illustrates a simplified, internal view of one embodiment of a nacelle of a wind turbine according to the present disclosure, particularly illustrating the nacelle during normal operation.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 46 may include a gearbox housing that is connected to the main frame 52 by one or more torque arms. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 100 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 100 (shown in FIG. 1) for modulating the pitch angel of a rotor blade 100 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 100 (shown in FIG. 1) for rotating the respective rotor blade 100 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 100 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 100.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 100 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

Figure 3:
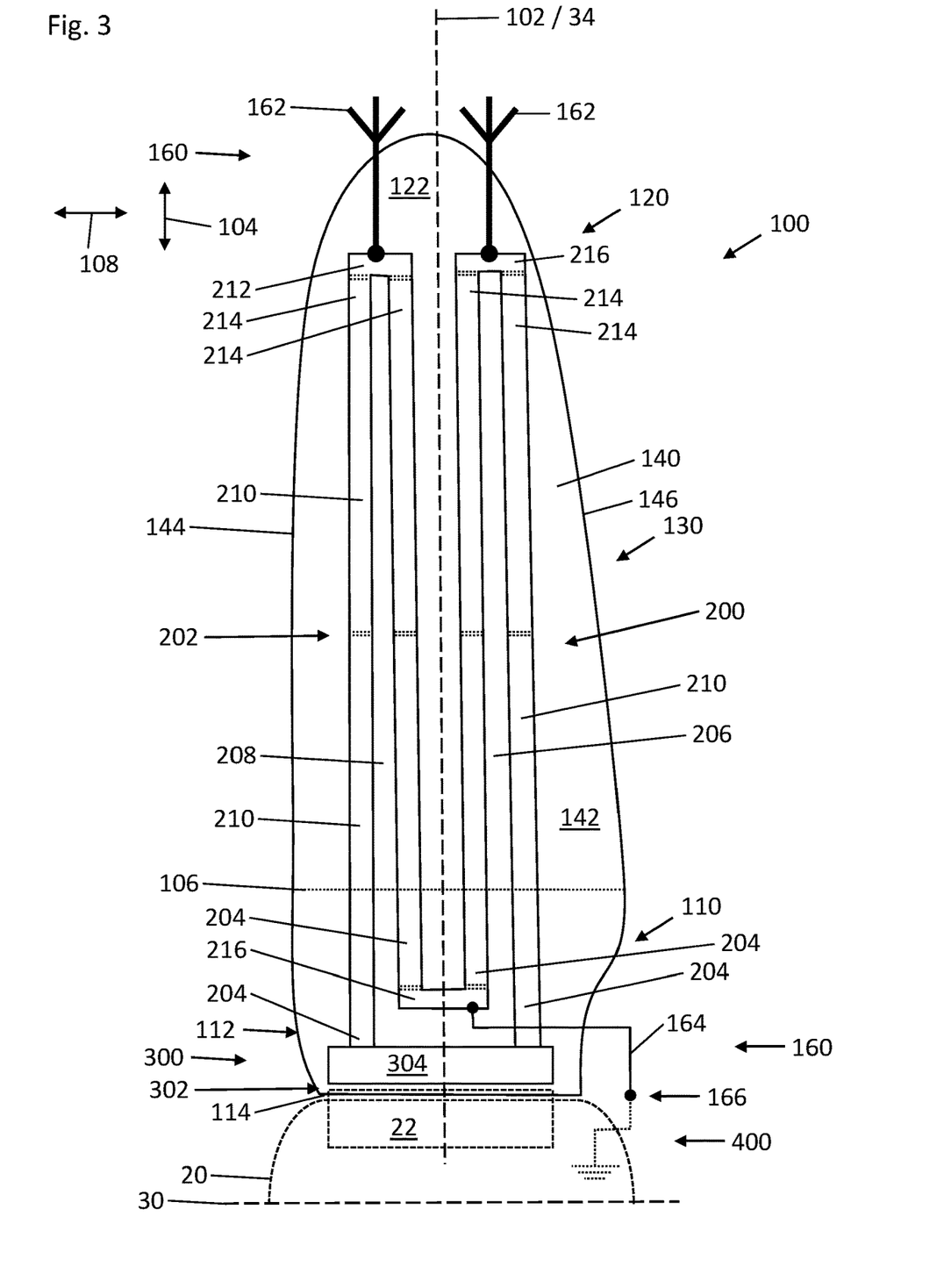
FIG. 3 schematically illustrates an embodiment of a rotor blade of a wind turbine of FIG. 1.

FIG. 3 is a non-limiting, schematic representation of a rotor blade 100 according to a specific embodiment, wherein a part of the hub 20 is shown by dashed lines. The entire rotor 18 comprising rotor blades 100 and the hub 20 is rotatable around the axis of rotation 30.

According to the representation of the subject matter of FIG. 3, the pitch axis 34 is identical to a longitudinal axis 102 of the rotor blade 100, wherein a longitudinal axis of a rotor blade may as well be different from the pitch axis, for example when having curved blades.

When describing the rotor blades 100, a longitudinal direction 104 is defined according to the longitudinal axis 102, and a chordwise direction 108 is determined according to a chord 106 of the rotor blade 100.

The rotor blade 100 can be structured in a tip section 120, a root section 110 and a middle section 130 connecting the root section 110 and the tip section 120. The rotor blade 100 comprises a blade root 112 in the root section 110, and a blade tip 122 in the tip section 120. The rotor blade 100 further comprises a suction surface 142 and a non-shown pressure surface formed by the blade skin 140. The pressure surface and the suction surface 142 are connected by a trailing edge 144 and a leading edge 146, both forming boundaries of the rotor blade surface in chordwise direction 108.

The rotor blade 100 comprises a heating arrangement 200 and a lightning arrangement 160.

The lightning arrangement 160 may include one or a plurality of lightning receptors 162 being arranged in the tip section 120 and being configured for receiving lightning bolts during a lightning situation, and furthermore comprise at least a grounding device 164.

The grounding device 164 is configured for being capable of conducting electrical energy of a lightning strike into a grounding arrangement 400 of the wind turbine 10, wherein an electrical connection between the grounding device 164 and the grounding arrangement 400 may be chosen according to its suitability. For example such electrical connection may be provided by conductive means 166, for example comprising a suitable spark gap or arching arrangement.

The heating arrangement 200 comprises a heating strip 202, according to FIG. 3 plurality of heating strips 202, in particular four heating strips 202. Each of the heating strips 202 comprise a root portion 204 and a tip portion 214.

The lightning receptor 162 is connected to one or to a plurality of tip portions 214 of a heating strip(s) 202. Lightning arrangement 160 becomes complete by electrically connecting the grounding device 164 to a root portion 204 or to a plurality of root portions 204 of heating strip(s) 202. Thus, the heating arrangement 200 and the lightning arrangement 160, at least partially, provide integrated functions and/or shared components, like at least one heating strip 202, which is participating to the functionality of the lightning arrangement 160 and in the meantime of the heating arrangement 200.

According to the non-limiting example, the root portions 204 of the chordwise outer heating strips 202 are connected to a blade transformer portion 304 of a transformer device 302 of an energy transfer arrangement 300, and root portions 204 of chordwise inner heating strips 202 are electrically connected to each other by a loop connector 216.

The heating strips 202 may be connected such that the heating strips 202 form a serial circuit, or form at least partially a serial circuit comprising parallel sub-circuits (heating loops 206, 208). For example, two tip portions 214 of heating strips 202 are connected to each other by the use of a respective connective element 212 and/or loop connectors 216 such that the four heating strips 202 form a serial connection, having a first heating loop 206 arranged in chordwise direction 108 toward the leading edge 144, and having a second heating loop 208 arranged in chordwise direction 108 toward the trailing edge 146. However, the location in chordwise direction 108 shall not limit the subject matter since further positioning possibilities may as well be suitable. For example, one heating loop may be arranged in the blade skin 142 of the suction surface 142, wherein another heating loop may be arranged in the blade skin of the pressure surface. Heating loops, serial and/or parallel connected to each other, may be provided in quantity and location for the suction surface 142 and/or for the pressure surface such, that the described deicing functionality is obtained.

According to the rotor blade 100 of FIG. 3, but not limited to, at least two heating loops 206, 208 are provided, wherein the grounding device 164 is connected with a portion of the heating arrangement 200 connecting two root portions 204 of heating strips 202 to each other.

Each of the heating strips 202—according to this non-limiting embodiment—are formed by two sub-strips 210 electrically connected to each other. However, further alternative embodiments of sub-strips 210 forming a heating strip 202 are possible. The respective electric connection between the sub-strips 210, but also an electric connection between connective elements 212, respectively loop connector 216 respective sub-strips 210, same as a connection between the heating strip 202 and the grounding device 164, all of these connections which from an electrical path of electrical energy of a lightning bolt are designed such, that electrical energy of a lightning bolt striking a lightning receptor 162 may be conducted into the grounding arrangement 400 without causing damage to the rotor blade 100.

The energy transfer arrangement 300 is configured for providing sufficient electrical energy to the heating arrangement 200 for achieving the described deicing functionality. The energy transfer arrangement 300 may comprise a transformer device 302 having a blade transformer portion 304 and a hub transformer portion 22, in particular wherein the hub transformer portion 22 may be firmly connected to the hub 20, and/or wherein the blade transformer portion 304 is firmly attached to the root section 110 and/or blade root 112 of the rotor blade 100.

According to a non-limiting example, the transformer device 302 is configured as being at least partially a toroidal transformer. For example, the hub transformer portion 22 of the transformer device may be a toroidal transformer portion or may comprise a toroidal transformer portion. In particular, at least a portion of the heating arrangement 200 may protrude a radial opening of the toroidal transformer portion and/or may embrace an outer ring of the toroidal transformer portion such that electrical energy can be induced into the heating arrangement 200 by the toroidal transformer portion.

For example, the heating arrangement 200 and the transformer device 302 is embodied such, that at least one heating strip 202 having an appropriate geometric configuration protrudes and/or embrace the at least one toroidal transformer portion of the hub transformer portion 22. In particular, the protrusion and/or embracing is determined such, that sufficient energy may be introduced in the heating arrangement 200 by the toroidal transformer portion. According to a specific embodiment, but not limited, the hub transformer portion 22 of the energy transfer arrangement 200 may comprise a plurality of toroidal transformer portions.

According to an embodiment, the blade transformer portion 304 of the transformer device may be at least partially formed by a root portion 204 of a heating strip 202 or by a plurality of root portions 204 thereof.

If the energy transfer arrangement 200 comprises a toroidal transformer (hub portion 22 of the energy transfer arrangement 200) the blade transformer portion 304 would be embodied by at least partially by a plurality of root portions 204 of a plurality of heating strips 202 protruding and/or embracing the toroidal transformer.

In particular, if the heating arrangement comprises a plurality of heating loops, in particular two heating loops, and wherein at least two heating loops are arranged electrically parallel with respect to each other, at least one root portion of each parallel arranged heating loop may protrude the toroidal transformer, wherein at least another root portion of each parallel heating loop may embrace the toroidal transformer. The root portions are connected to each other in order to form the serial/parallel heating loops. This This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, for example that the two heating loops 206, 208 of FIG. 3 are connected to each other in a parallel way such that each heating loop 206, 208 itself has a serial configuration. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, wherein it might be for example possible, that the lightning receptor 162 is connected to both heating loops 206, and thereby connecting tip portions 214 of heating.

| REFERENCE NUMBERS | |
|---|---|
| 10 | wind turbine |
| 12 | tower |
| 14 | support system |
| 16 | nacelle |
| 18 | rotor |
| 20 | rotatable hub |
| 22 | hub transformer portion |
| 26 | load transfer regions |
| 28 | wind direction |
| 30 | axis of rotation |
| 32 | pitch system |
| 34 | pitch axes |
| 36 | wind turbine controller |
| 38 | yaw axis |
| 40 | processor |
| 42 | electric generator |
| 44 | main shaft |
| 46 | gearbox |
| 48 | high speed shaft |
| 50 | coupling |
| 52 | main frame |
| 54 | decoupling support means |
| 56 | yaw drive mechanism |
| 58 | meteorological mast |
| 60 | forward support bearing |
| 62 | aft support bearing |
| 64 | drive train |
| 66 | pitch assembly |
| 68 | pitch drive system |
| 70 | sensor |
| 72 | pitch bearing |
| 74 | pitch drive motor |
| 76 | pitch drive gearbox |
| 78 | pitch drive pinion |
| 80 | pitch control system |
| 84 | power generator |
| 86 | cavity |
| 88 | inner surface |
| 90 | outer surface |
| 100 | rotor blade |
| 102 | longitudinal axis |
| 104 | longitudinal direction |
| 106 | chord |
| 108 | chordwise direction |

| REFERENCE NUMBERS -continued | |
|---|---|
| 110 | root section |
| 112 | blade root |
| 114 | root flange |
| 120 | tip section |
| 122 | blade tip |
| 130 | middle section |
| 140 | blade skin |
| 142 | suction surface |
| 144 | leading edge |
| 146 | trailing edge |
| 160 | lightning arrangement |
| 162 | lightning receptor |
| 164 | grounding device |
| 166 | conductive means |
| 200 | heating arrangement |
| 202 | heating strip |
| 204 | root portion |
| 206 | first heating loop |
| 208 | second heating loop |
| 210 | sub-strip |
| 212 | connective element |
| 214 | tip portion |
| 216 | loop connector |
| 300 | energy transfer arrangement |
| 302 | transformer device |
| 304 | blade transformer portion |
| 400 | grounding arrangement |

The invention claimed is:

1. A rotor blade for a wind turbine, comprising:
a root section having a blade root; a tip section having a blade tip;
a middle section between the root section and the tip section;
a blade skin forming a suction surface and a pressure surface of the rotor blade;
an electric heating arrangement comprising at least one heating strip having a width-thickness relation configured to reduce an adhesive bonding between ice and the blade skin by electrically heating a respective surface of the blade skin and to conduct lightning-caused currents of at least 10 kA;
an energy transfer arrangement electrically connected to the heating arrangement to supply electrical energy to the heating arrangement; and
an integrated lightning arrangement, comprising:
a lightning receptor mounted to the tip section and electrically connected to the heating strip such that a totality of electrical energy of a lightning strike is conducted from the lightning receptor to the heating strip; and
a grounding device mounted to or in the root section and electrically connected to a grounding arrangement of the wind turbine such that electrical energy of a lightning strike is conducted from the heating strip through the grounding device and into the grounding arrangement.

2. The rotor blade according to claim 1, wherein the at least one heating strip has a width-thickness relation of at least 50:1.

3. The rotor blade according to claim 1, wherein the at least one heating strip extends over 50% of a total length of the rotor blade in a longitudinal direction of the rotor blade.

4. The rotor blade according to claim 1, wherein the heating arrangement comprises a heating loop having two of the heating strips connected to each other in the tip section, each of the heating strips having a root portion arranged in the root section, at least one of the root portions electrically connected to the energy transfer arrangement.

5. The rotor blade according to claim 1, wherein the at least one heating strip is laminated within the blade skin.

6. The rotor blade according to claim 1, wherein the heating arrangement is configured to introduce at least 10 kW of heat energy into the blade skin, wherein the heat energy exceeds 0.1 kW/m$^2$ and is not more than 20 kW/m$^2$ of the surface of the blade skin.

7. The rotor blade according to claim 1, wherein the at least one heating strip is laminated within the blade skin comprises one of: a continuous solid material, a plurality of electrically connected sub-strips, a mesh ribbon, or a woven matt.

8. The rotor blade according to claim 1, wherein the at least one heating strip is made from copper or a copper alloy having a purity of more than 80%.

9. The rotor blade according to claim 1, wherein the heating arrangement (200) comprises an even number of the heating strips formed into respective loops of two of the heating strips per loop.

10. The rotor blade according to claim 1, wherein the at least one heating strip comprises a plurality of parallel aligned single conductors not exceeding 50 of the single conductors.

11. A rotor of a wind turbine, comprising:
a rotatable hub;
at least one rotor blade according to the rotor blade of claim 1 rotatably mounted to the hub; and
the hub comprising a pitch assembly that rotates the rotor blade about a pitch axis.

12. The rotor according to claim 11, wherein the energy transfer arrangement comprises a transformer device having a blade transformer portion mounted to the root section and electrically connected to the heating arrangement and a hub transformer portion mounted to the hub, wherein the transformer device provides contactless transmission of electrical energy from the hub transformer portion to the blade transformer portion.

13. A wind turbine, comprising:
a rotor, the rotor further comprising a rotatable hub;
at least one rotor blade according to the rotor blade of claim 1 rotatably mounted to the hub; and
the hub comprising a pitch assembly that rotates the rotor blade about a pitch axis.

14. A rotor blade for a wind turbine, comprising:
a root section having a blade root; a tip section having a blade tip;
a middle section between the root section and the tip section;
a blade skin forming a suction surface and a pressure surface of the rotor blade;
an electric heating arrangement comprising at least one heating strip having a width-thickness relation configured to reduce an adhesive bonding between ice and the blade skin by electrically heating a respective surface of the blade skin and to conduct lightning-caused currents of at least 10 kA;
an energy transfer arrangement electrically connected to the heating arrangement to supply electrical energy to the heating arrangement;
an integrated lightning arrangement, comprising:
a lightning receptor mounted to the tip section and electrically connected to the heating strip such that electrical energy of a lightning strike is conducted from the lightning receptor to the heating strip;
a grounding device mounted to or in the root section and electrically connected to a grounding arrangement of the wind turbine such that electrical energy of a lightning strike is conducted from the heating strip through the grounding device and into the grounding arrangement; and
wherein the heating arrangement has an overall resistance of at least 0.1 ohm and not more than 1 ohm.

15. A rotor blade for a wind turbine, comprising:
a root section having a blade root; a tip section having a blade tip;
a middle section between the root section and the tip section;
a blade skin forming a suction surface and a pressure surface of the rotor blade;
an electric heating arrangement comprising at least one heating strip having a width-thickness relation configured to reduce an adhesive bonding between ice and the blade skin by electrically heating a respective surface of the blade skin and to conduct lightning-caused currents of at least 10 kA;
an energy transfer arrangement electrically connected to the heating arrangement to supply electrical energy to the heating arrangement;
an integrated lightning arrangement, comprising:
a lightning receptor mounted to the tip section and electrically connected to the heating strip such that electrical energy of a lightning strike is conducted from the lightning receptor to the heating strip;
a grounding device mounted to or in the root section and electrically connected to a grounding arrangement of the wind turbine such that electrical energy of a lightning strike is conducted from the heating strip through the grounding device and into the grounding arrangement; and
wherein the energy transfer arrangement comprises a transformer device having a blade transformer portion mounted to the root section and electrically connected to the heating arrangement and a hub transformer portion mounted to a rotor hub of a rotor of the wind turbine, wherein the transformer device provides contactless transmission of electrical energy from the hub transformer portion to the blade transformer portion.

* * * * *